United States Patent Office 3,214,499
Patented Oct. 26, 1965

3,214,499
PROCESS FOR MAKING NUCLEAR FUEL
ELEMENT
John B. Burnham, Jr., Bloomfield Hills, Mich., and James
G. Darrah, Wethersfield, Conn., assignors to General
Motors Corporation, Detroit, Mich., a corporation of
Delaware
No Drawing. Original application Nov. 3, 1958, Ser. No.
771,248, now Patent No. 3,129,141, dated Apr. 14,
1964. Divided and this application Nov. 29, 1962,
Ser. No. 247,784
5 Claims. (Cl. 264—.5)

This application is a division of the patent application Serial No. 771,248, filed November 3, 1958, and now Patent No. 3,129,141.

This invention relates to an improved fuel element and fuel element material for nuclear reactors, and to a process for making same.

Some of the ideal characteristics sought in a nuclear reactor fuel element are: good thermal conductivity, high heat resistance and heat shock ressitance, corrosion resistance, high mechanical strength even at elevated temperatures, good dimensional stability, high fission product retention, high density of fissionable material and easy formability. It is an object of the present invention to provide an improved nuclear reactor fuel element and fuel element material which have the aforementioned physical characteristics to a marked degree. Another object of the invention is the provision of a process for making such a fuel element. More specifically, it is an object of the present invention to provide a nuclear reactor fuel element which contains silicon bonded silicon carbide as its base material and which has incorporated therein the desired quantity of fissionable material.

These and other objects and advantages of the invention will appear more clearly from the following detailed description of preferred embodiments thereof.

In accordance with the invention the fuel element comprises a dense body consisting essentially of uranium carbide, graphite, silicon carbide and silicon, the uranium carbide preferably being present in an amount sufficient to provide from about 1% to 50% by weight uranium in the body. The uranium carbide, either the monocarbide or the dicarbide, is in the form of particles or agglomerations of particles each of which is at least partially enclosed by a dense coating of graphite, these graphite-coated or partially coated uranium carbide particles or agglomerations being supported by a matrix of silicon bonded silicon carbide. The dispersion of the uranium carbide is substantially uniform throughout the matrix though, as indicated, there may be substantially uniformly distributed agglomerations of these particles. The composition will be understood in greater detail from the following description of the process for its manufacture.

A quantity of graphite bonded uranium carbide, preferably containing about 30% or more by weight uranium and the remainder carbon, is pulverized to a grain size of from 40 mesh to 200 mesh. The resulting granular product is then mixed, either alone or preferably in combination with a quantity of silicon carbide grain, with a phenol formaldehyde or other suitable resin binder. This mixture is then cold or hot pressed to the desired shape and heated in a suitable atmosphere to cure the resin and drive off the volatiles. Where heat pressing is used, from 3,000 to 10,000 p.s.i. pressure is satisfactory; for cold pressing, 30,000 to 60,000 p.s.i. pressure is desirable. The resulting pressed and cured briquette is then immersed for a short period into molten silicon at from about 3200° F. to 3600° F. during which immersion the resin carbonizes and reacts with the molten silicon to form silicon carbide.

The graphite-uranium carbide used as the starting material is presently well known in the art and consists of uranium carbide particles, either the monocarbide or the dicarbide as desired, embedded in a dense matrix of graphite. Thus, the product resulting from the granulation of this material consists of uranium carbide grains at least partially covered with dense graphite. This graphite has the extremely important function of serving as a barrier against excessive attack of the uranium carbide by the molten silicon during the subsequent immersion operation. In this connection, it is best that the material be pulverized to a grain size no smaller than about 200 mesh since further reduction in particle size results in excessive exposure of the uranium carbide. Also, with a grain size smaller than 200 mesh there is not sufficient porosity in the cured resin bonded briquette to permit thorough penetration by the molten silicon during the immersion step with the result that the final product is too porous. When a grain size larger than 40 mesh is used, the uranium is not sufficiently uniformly distributed in the final product.

The raw batch for the pressing operation may consist of from 5% to 95% (by weight) graphite-uranium carbide, from 5% to 15% resin binder and from 0% to 90% silicon carbide grain, the latter, if included, preferably having a grain size of from 40 to 200 mesh, 100 mesh being typical. The exact chemical composition of the final product is difficult to determine; however, a close approximation is possible from the precise proportions, within the above ranges, used in making the raw batch, keeping in mind that some of the carbon from the binder is converted to silicon carbide during the silicon impregnation step. The final product contains on the order of 10% to 20% by weight silicon as such from the immersion step. For optimum heat conduction and other physical properties, it is preferable that at least about 10% silicon carbide be included in the raw batch.

It is sometimes desired to have the uranium-bearing silicon bonded silicon carbide enclosed within a casing of non-uranium-bearing silicon bonded slicon carbide. To make a monolithic structure of this type the pressed resin bonded mixture of graphite-uranium carbide with or without silicon carbide may be surrounded with a mixture of silicon carbide grain plus resin binder and hot or cold pressed to thereby form a briquette having its interior formed of the fissionable mixture and its exterior portions formed of the resin bonded silicon carbide. This briquette is then immersed into molten silicon in the manner described above. The resulting monolithic structure consists of an interior portion of silicon bonded silicon carbide plus graphite coated uranium carbide, and an exterior layer of silicon bonded silicon carbide.

The following specific examples will serve to more fully illustrate the process of this invention:

(1) A quantity of graphite bonded uranium carbide containing about 30% by weight uranium is pulverized to a grain size of 100 mesh. About 40 parts by weight of this material plus 45 parts 100 mesh silicon carbide grain and 15 parts phenol formaldehyde binder (Monsanto No. 1128) are mixed thoroughly and then pressed for about 15 minutes at about 350° F. and 3,500 p.s.i. to form a rod-shaped briquette. The briquette is then cured for about 4 hours at 450° F. in a nitrogen atmosphere. After cooling, the cured briquette is immersed in molten silicon maintained at a temperature of about 3250° F. to 3400° F. for about two to five minutes and then withdrawn and allowed to cool.

(2) Same as (1) except that the rod-shaped briquette is surrounded by a mixture of 15% of the resin binder and 85% 100 mesh silicon carbide, and the briquette plus surrounding material are then pressed for about 15 minutes at 350° F. and 3,500 p.s.i. The resulting briquette is then cured and immersed in molten silicon as described.

The product made by the process described has a density greater than 2.7 grams per cubic centimeter and an apparent porosity of less than 1%. It has a low thermal neutron cross section, evenly dispersed fuel, good fission product retention as well as excellent thermal properties and strength characteristics.

While the invention has been described with reference to particular embodiments thereof, it is understood that changes and modifications may be made, all within the full and intended scope of the claims which follow.

We claim:

1. A method for making a nuclear reactor fuel element comprising the steps of forming a uniform pulverant mixture of from 5% to 90% by weight graphite bonded uranium carbide having a grain size of from 40 to 200 mesh, from 0 to 90% by weight silicon carbide and from 5% to 15% by weight organic resin binder, forming said mixture into a briquette and then immersing said briquette into molten silicon.

2. A method for making a nuclear reactor fuel element comprising the steps of forming a uniform pulverant mixture of from 5% to 95% by weight graphite bonded uranium carbide having a grain size of from 40 to 200 mesh, from 10% to 90% by weight silicon carbide also having a grain size of from 40 to 200 mesh and from 5% to 15% by weight organic resin binder, forming said mixture into a briquette and then immersing said briquette into molten silicon.

3. A method for making a nuclear reactor fuel element comprising the steps of forming uniform pulverant mixture of from 5% to 95% by weight graphite bonded uranium carbide having a grain size of from 40 to 200 mesh, from 0 to 90% by weight silicon carbide and from 5% to 15% by weight organic resin binder, pressing said mixture into a briquette, heating said briquette to cure the resin and then immersing said briquette for a short period into molten silicon maintained at a temperature of from about 3200° F. to 3600° F.

4. A method for making a nuclear reactor fuel element comprising the steps of pulverizing a mass of graphite bonded uranium carbide to a grain size of from 40 to 200 mesh, forming a uniform mixture of from 5% to 95% by weight of the pulverized graphite bonded uranium carbide, from 0 to 90% by weight pulverized silicon carbide and from 5% to 15% by weight phenol formaldehyde resin binder, pressing said mixture into a briquette, heating said briquette to cure said resin and then immersing said briquette for a short period into molten silicon maintained at a temperature of from about 3200° F. to 3600° F.

5. A method for making a nuclear reactor fuel element comprising the steps of forming a uniform pulverant mixture of from 5% to 95% by weight graphite bonded uranium carbide containing at least 30% by weight uranium and having a grain size of about 100 mesh, from 10% to 90% by weight silicon carbide also having a grain size of about 100 mesh and from 5% to 15% by weight organic resin binder, forming said mixture into a briquette and then immersing said briquette into molten silicon.

References Cited by the Examiner
UNITED STATES PATENTS

| | | | |
|---|---|---|---|
| 2,431,326 | 11/47 | Heyroth | 117—169 |
| 2,950,238 | 8/60 | Nicholson | 204—154.2 |
| 3,041,260 | 6/62 | Goeddel | 204—154.2 |
| 3,079,316 | 2/63 | Johnson | 204—154.2 |

REUBEN EPSTEIN, *Primary Examiner.*